(12) United States Patent
Himmelreich et al.

(10) Patent No.: US 8,739,654 B2
(45) Date of Patent: Jun. 3, 2014

(54) TORQUE TRANSMISSION DEVICE

(75) Inventors: Peter Himmelreich, Friesenheim (DE); Michael Lipps, Urloffen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 423 days.

(21) Appl. No.: 12/082,671

(22) Filed: Apr. 10, 2008

(65) Prior Publication Data

US 2008/0282837 A1    Nov. 20, 2008

Related U.S. Application Data

(63) Continuation of application No. PCT/DE2006/001630, filed on Sep. 16, 2006.

(30) Foreign Application Priority Data

Oct. 11, 2005 (DE) .......................... 10 2005 048 617

(51) Int. Cl.
*F16F 15/10* (2006.01)
*F16F 15/12* (2006.01)
*F16D 47/02* (2006.01)

(52) U.S. Cl.
USPC .......... 74/574.4; 74/572.2; 192/30 V; 192/200

(58) Field of Classification Search
USPC ........ 74/572.2, 574.4, 573.12, 574.1, 574.21; 464/66.1, 67.1, 68.1, 68.6, 68.92; 192/55.61, 212, 30 V, 70.16, 70.17
See application file for complete search history.

(56) References Cited

U.S. PATENT DOCUMENTS

| | | | | |
|---|---|---|---|---|
| 4,723,463 A * | 2/1988 | Reik et al. | .................... | 192/30 V |
| 4,727,970 A * | 3/1988 | Reik et al. | .................... | 192/70.17 |
| 4,901,596 A * | 2/1990 | Reik et al. | .................... | 192/30 V |
| 4,989,710 A * | 2/1991 | Reik et al. | .................... | 192/70.17 |
| 5,377,560 A * | 1/1995 | Schierling et al. | ......... | 464/68.92 |
| 5,860,500 A * | 1/1999 | Olsen et al. | ................... | 192/212 |
| 6,334,816 B1 * | 1/2002 | Wack et al. | ................... | 192/212 |
| 6,814,194 B2 * | 11/2004 | Back et al. | .................. | 192/30 V |
| 6,915,886 B2 * | 7/2005 | Dacho et al. | ................. | 192/70.17 |
| 7,226,384 B2 * | 6/2007 | Tryon et al. | ................. | 192/70.17 |
| 2001/0032769 A1 * | 10/2001 | Lehmann et al. | ......... | 192/55.61 |
| 2004/0060793 A1 * | 4/2004 | Dacho et al. | ............. | 192/70.17 |
| 2005/0028638 A1 | 2/2005 | Fenioux et al. | ................ | 74/574 |
| 2005/0039998 A1 * | 2/2005 | Zuehl et al. | ................. | 192/70.16 |
| 2005/0039999 A1 * | 2/2005 | Back et al. | ................. | 192/30 V |
| 2005/0076739 A1 * | 4/2005 | Uduka et al. | ................... | 74/572 |
| 2005/0279604 A1 * | 12/2005 | Vetter et al. | ................ | 192/55.61 |

FOREIGN PATENT DOCUMENTS

| | | | |
|---|---|---|---|
| DE | 41 13 287 A1 | | 10/1991 |
| EP | 49805 A1 | * | 4/1982 |
| EP | 1 637 766 B1 | | 1/2007 |
| FR | 2 844 856 A1 | | 3/2004 |
| GB | 2 243 899 A | | 11/1991 |

* cited by examiner

*Primary Examiner* — Daniel Yabut
(74) *Attorney, Agent, or Firm* — Alfred J. Mangels

(57) ABSTRACT

A torque transmitting unit for inclusion in the drive train of a motor vehicle. The unit transmits torque between an engine having an output shaft and a transmission having at least one input shaft that is drivingly coupled with the engine by a clutch and a intermediate torsional vibration damper. The torque transmitting unit includes primary and secondary flywheel masses that are mounted on the transmission input shaft along with the clutch.

4 Claims, 1 Drawing Sheet

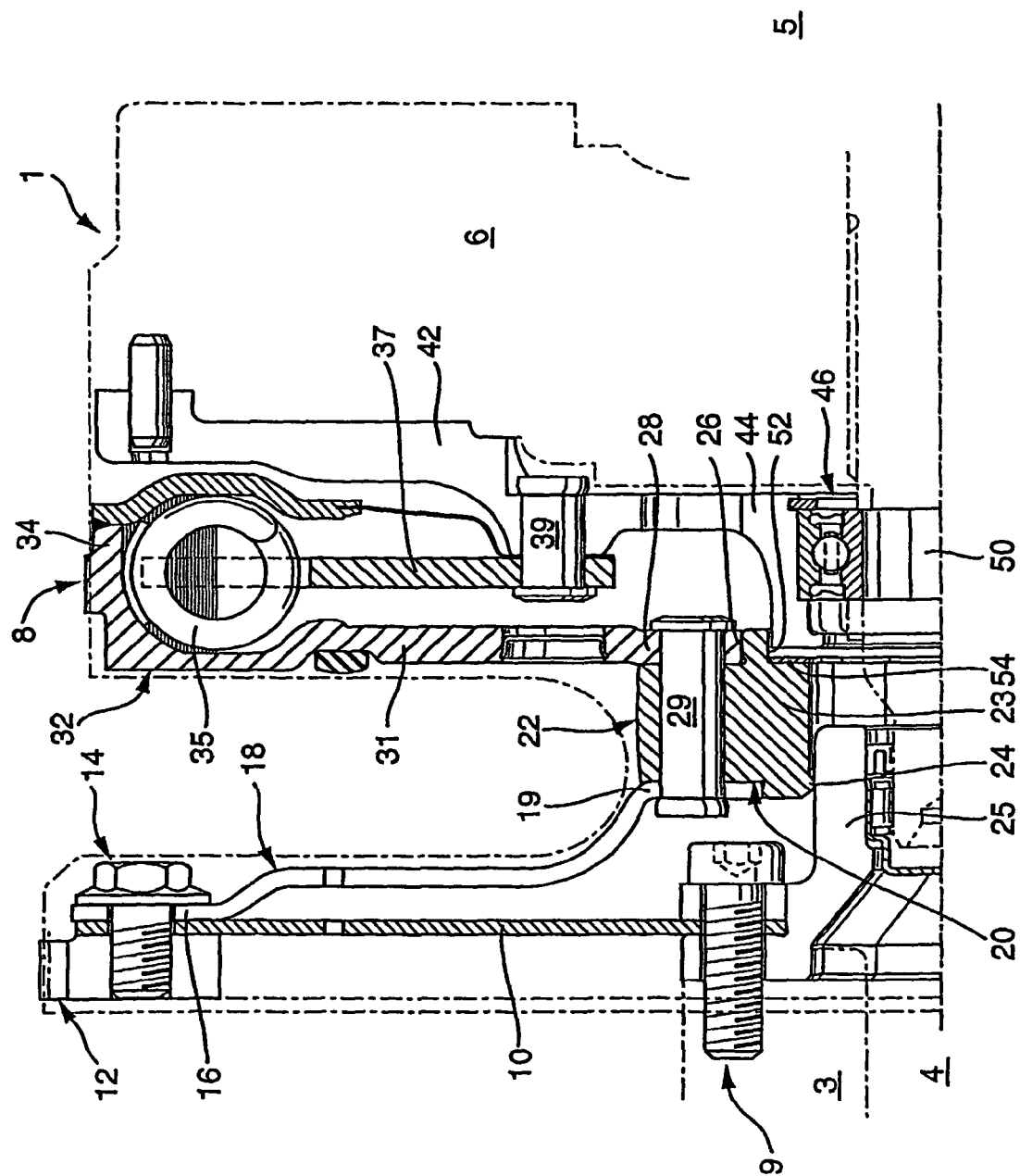

TORQUE TRANSMISSION DEVICE

CROSS-REFERENCE TO RELATED APPLICATION

This is a continuation of International Application Serial No. PCT/DE2006/001630, with an international filing date of Sep. 16, 2006, and designating the United States, the entire contents of which is hereby incorporated by reference to the same extent as if fully rewritten.

BACKGROUND OF THE INVENTION

The present invention relates to a torque transmission device in the drive train of a motor vehicle for the transmission of torque between a drive unit, in particular an internal combustion engine having an output shaft, in particular a crankshaft, and a transmission having at least one transmission input shaft that can be coupled to the output shaft of the drive unit by a clutch. A torsional vibration damper including a primary flywheel mass and a secondary flywheel mass is interposed between the drive unit and the transmission.

An object of the present invention is to provide a torque transmission device in the drive train of a motor vehicle for the transmission of torque between a drive unit having an output shaft, and a transmission having at least one transmission input shaft that is coupled to the output shaft of the drive unit by a clutch. The torque transmitting unit includes a torsional vibration damper interposed between the drive unit and the transmission and including a primary flywheel mass and a secondary flywheel mass, and which is simply constructed and is capable of being manufactured economically.

SUMMARY OF THE INVENTION

The object of the invention is achieved in the case of a torque transmission device in the power train of a motor vehicle for transmitting torque between a drive unit, in particular an internal combustion engine, having an output shaft, in particular a crankshaft, and a transmission having at least one transmission input shaft that can be coupled to the output shaft of the drive unit with the aid of a clutch. A torsional vibration damper is interposed between the engine and the transmission and includes a primary flywheel mass and a secondary flywheel mass. The primary flywheel mass and the secondary flywheel mass of the torsional vibration damper are mounted together with the clutch on the transmission input shaft. Preferably, a bearing, such as a roller bearing, is situated radially inside of and overlapping in the axial direction an output flange of the torsional vibration damper.

A preferred exemplary embodiment of the torsional vibration damper is characterized in that the primary flywheel mass is linked through a cup-shaped carrier plate to a sheet metal drive plate, which is attached to the output shaft of the drive unit. The cup-shaped carrier plate permits a greater distance between the drive unit and the transmission in the axial direction.

Another preferred exemplary embodiment of the torque transmission device is characterized in that the primary flywheel mass and the carrier plate are attached to an annular connecting element having two end faces. Preferably, the primary flywheel mass and the carrier plate are attached to the connecting element by rivet fastening elements.

Another preferred exemplary embodiment of the torque transmission device is characterized in that the primary flywheel mass is attached radially inwardly on the end face of the connecting element that faces the transmission. The primary flywheel mass has essentially the shape of an annular disk.

Another preferred exemplary embodiment of the torque transmission device is characterized in that radially outwardly of the end face of the connecting element that faces the transmission, a step is provided to receive a radially inner circumferential rim of the primary flywheel mass. That serves to simplify assembly.

Another preferred exemplary embodiment of the torque transmission device is characterized in that a step is provided radially inwardly on the end face of the connecting element that faces the transmission. That step makes it possible to check the torsion characteristic of the torsional vibration damper prior to assembly and during manufacturing.

Another preferred exemplary embodiment of the torque transfer device is characterized in that a centering projection is provided radially inwardly on the connecting element. The centering projection serves during assembly to pre-center the connecting element on a bearing hub that is connected to the output shaft of the drive unit.

Another preferred exemplary embodiment of the torque transmission device is characterized in that radially outwardly of the end face of the connecting element that faces away from the transmission, a step is provided to receive a radially inner circumferential rim of the carrier plate. That serves to simplify assembly.

Another preferred exemplary embodiment of the torque transmission device is characterized in that on its radially inner side and on its radially outer side the carrier plate has an essentially annular disk-shaped attachment flange. The radially outer attachment flange serves to attach the carrier plate to a drive plate, which, in turn, is attached radially inwardly to the output shaft of the drive unit.

Another preferred exemplary embodiment of the torque transmission device is characterized in that the two attachment flanges of the carrier plate are spaced from each other in the axial direction. Because of the axial spacing between the attachment flanges, the axial distance between the drive unit and the transmission can be varied.

BRIEF DESCRIPTION OF THE DRAWING

Additional advantages, characteristics, and details of the invention will become evident from the following description, in which an exemplary embodiment is described in detail with reference to the drawing. The characteristics mentioned in the claims and in the description can be essential to the invention individually by themselves or in any combination.

FIG. 1 shows a half-sectional view through an embodiment of a torque transmission device in accordance with the present invention.

DESCRIPTION OF THE PREFERRED EMBODIMENTS

Part of a power train 1 of a motor vehicle is shown in FIG. 1. Situated between a drive unit 3, in particular an internal combustion engine from which a crankshaft 4 extends, and a transmission 5, is a clutch 6. Connected between drive unit 3 and clutch 6 is a torsional vibration damper 8. The torsional vibration damper 8 is preferably a damped flywheel. The crankshaft 4 of internal combustion engine 3 is rigidly connected through threaded connections 9 to a drive plate 10, which has essentially the form of an annular disk extending in the radial direction. The drive plate 10 is also referred to as a flexplate. A starter ring gear 12 is provided radially outwardly on the drive plate 10.

An attachment flange 16 of a cup-shaped carrier plate 18 is attached to the radial outer circumferential area of the drive plate 10 by threaded fasteners 14. Radially inwardly the carrier plate 18 has an attachment flange 19. The attachment flange 19 rests on a step 20 that is formed on an end face of a connecting element 22 that faces away from the transmission. The connecting element 22 has the form of an annulus 23, on which a circular centering projection 24 extends radially inwardly. The centering projection 24 is in contact with a bearing hub 25, which extends from the crankshaft 4 of the drive unit 3 toward the transmission 5.

On the end face of connecting element 22 that faces the transmission 5 a step 26 is formed, which serves to receive an attachment flange 28. Attachment flange 28 is secured together with attachment flange 19 to connecting element 22 by rivet fastening elements 29. Attachment flange 28 is part of a primary flywheel mass 31 of an input part 32 of torsional vibration damper 8. Input part 32 of torsional vibration damper 8 has essentially the form of a radially extending annular disk that forms a radially outer torsional vibration damper retainer 34. At least partially incorporated into torsional vibration damper retainer 34 is at least one energy storage device, in particular a spring 35. The spring 35 is engaged by an output part 37, also known as an output flange, of the torsional vibration damper 8.

A secondary flywheel mass 42 of the torsional vibration damper 8 is attached to the output part 37 by rivet fastening elements 39. The secondary flywheel mass 42 is connected radially inwardly to an integral hub 44. The hub 44 of the secondary flywheel mass 42 is rotatably supported on a transmission input shaft 50 of transmission 5 by a roller bearing 46. The roller bearing 46 is preferably a ball bearing.

Radially inwardly on the end face of the connecting element 22 that faces the transmission 5 is a step 52 that is used prior to assembly of torsional vibration damper 8 for rotatable support of the hub 44. An axial thrust ring 54 is incorporated into the step 52 for that purpose. The hub 44 comes to rest against the axial thrust ring 54 prior to assembly in order to measure the torsion characteristic of the torsional vibration damper 8 during production. In the assembled state of the torsional vibration damper 8, the step 52 on the connecting element 22 has no function.

What is claimed is:

1. A torque transmitting device in a drive train of a motor vehicle for transmission of torque between a drive unit having an output shaft and a transmission having at least one transmission input shaft that is coupled to the output shaft of the drive unit by a clutch, said torque transmitting device comprising:

a torsional vibration damper positioned between the drive unit and the transmission and including
a primary flywheel mass,
a secondary flywheel mass, and
at least one energy storage device carried by the primary flywheel mass for engagement with an output part carried by the secondary flywheel mass,
wherein the primary flywheel mass and the secondary flywheel mass of the torsional vibration damper and the clutch are each radially supported on respective bearings each carried by the at least one transmission input shaft and are each rotatable relative to the at least one transmission input shaft,
wherein the primary flywheel mass is operatively connected through a radially-extending carrier plate that includes a radially-extending outer attachment flange for attachment to a drive plate that is operatively connected with the drive unit output shaft, and that includes a radially-extending inner attachment flange that abuts a radial step formed on an annular connecting element,
wherein the outer and inner radially-extending flanges of the carrier plate are spaced from each other in an axial direction of the torque transmitting device,
wherein the primary flywheel mass and the carrier plate are attached to the annular connecting element, wherein the annular connecting element includes two opposed end faces including a first radially-extending end face that faces the transmission and to which the primary flywheel mass is attached, and a second radially-extending end face that faces the drive unit and to which the carrier plate is attached,
wherein a radially outwardly facing step is provided on the first end face of the annular connecting element to abut a radially inner circumferential rim of the primary flywheel mass,
wherein the radial step is provided on the second end face of the annular connecting element to abut a radially inner circumferential rim of the carrier plate, and
wherein the radial step and the radially outwardly facing step are disposed radially inward of a radially outermost surface of the annular connecting element.

2. A torque transmitting device in accordance with claim 1, wherein a radially inwardly facing step is provided on the first end face of the annular connecting element.

3. A torque transmitting device in accordance with claim 1, wherein a radially inwardly extending centering projection is provided on an inner surface of the annular connecting element.

4. A torque transmitting device in accordance with claim 1, wherein the radially extending outer and inner attachment flanges of the carrier plate are annular.

* * * * *